(12) United States Patent
Zheng et al.

(10) Patent No.: US 11,784,372 B2
(45) Date of Patent: Oct. 10, 2023

(54) END PLATE FOR BATTERY MODULE, AND BATTERY MODULE

(71) Applicant: CONTEMPORARY AMPEREX TECHNOLOGY CO., LIMITED, Ningde (CN)

(72) Inventors: Shixiong Zheng, Ningde (CN); Lei Wang, Ningde (CN); Pengfei Li, Ningde (CN); Congcheng Qi, Ningde (CN); Qiangguo Zhao, Ningde (CN); Ni Fang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 424 days.

(21) Appl. No.: 17/127,650

(22) Filed: Dec. 18, 2020

(65) Prior Publication Data

US 2021/0119295 A1    Apr. 22, 2021

Related U.S. Application Data

(63) Continuation of application No. PCT/CN2020/072576, filed on Jan. 17, 2020.

(30) Foreign Application Priority Data

Apr. 16, 2019   (CN) .......................... 201920515643.8

(51) Int. Cl.
*H01M 50/227*   (2021.01)
*H01M 50/262*   (2021.01)
(Continued)

(52) U.S. Cl.
CPC ....... *H01M 50/227* (2021.01); *H01M 50/209* (2021.01); *H01M 50/224* (2021.01); *H01M 50/262* (2021.01)

(58) Field of Classification Search
None
See application file for complete search history.

(56) References Cited

U.S. PATENT DOCUMENTS

2017/0352850 A1* 12/2017 Nagane ............... H01M 50/236
2018/0301668 A1* 10/2018 Nicholls ............... H01M 10/04

FOREIGN PATENT DOCUMENTS

CN   103996803 A   8/2014
CN   204809283 U * 11/2015 .......... H01M 2/1077
(Continued)

OTHER PUBLICATIONS

Machine translation of CN-106654103-A. (Year: 2017).*
(Continued)

*Primary Examiner* — Gregg Cantelmo
(74) *Attorney, Agent, or Firm* — Kilpatrick Townsend & Stockton LLP

(57) ABSTRACT

This application relates to an end plate of a battery module as well as a battery module. The end plate includes a body and a connector connected to the body. The body is fixedly connected to a side plate through the connector. The connector is provided with a light shielding part. The light shielding part is located on a side of the connector that faces the side plate, and located between the connector and the side plate. In the end plate as well as the battery module according to this application, the end plate includes the body and the connector, and weldability between the body and the side plate is improved by the connector. The connector includes a light shielding part that avoids the problem of battery explosion caused by a laser beam radiated to a battery inside the battery module, and improves safety performance of the battery.

14 Claims, 4 Drawing Sheets

(51) Int. Cl.
   *H01M 50/224*   (2021.01)
   *H01M 50/209*   (2021.01)

(56)  References Cited

FOREIGN PATENT DOCUMENTS

| | | | | |
|---|---|---|---|---|
| CN | 106654103 A | * | 5/2017 | .......... H01M 2/1005 |
| CN | 106654103 A | | 5/2017 | |
| CN | 206849895 U | | 1/2018 | |
| CN | 107768566 A | | 3/2018 | |
| CN | 207183354 U | | 4/2018 | |
| CN | 209496929 U | | 10/2019 | |
| EP | 3352245 A1 | | 7/2018 | |
| EP | 3506388 A1 | | 7/2019 | |
| EP | 3506390 | | 7/2019 | |
| JP | H10269999 A | | 10/1998 | |

OTHER PUBLICATIONS

Contemporary Amperex Technology Co., Limited, International Search Report and Written Opinion, PCT/CN2020/072576, dated Mar. 17, 2020, 14 pgs.
Contemporary Amperex Technology Co., Limited, Extended European Search Report, EP20792065.3, dated Jun. 9, 2022, 8 pgs.

* cited by examiner

END PLATE FOR BATTERY MODULE, AND BATTERY MODULE

CROSS REFERENCE TO RELATED APPLICATIONS

This application is a continuation application of PCT Patent Application No. PCT/CN2020/072576, entitled "END PLATE FOR BATTERY MODULE, AND BATTERY MODULE" filed on Jan. 17, 2020, which claims priority to Chinese Patent Application No. 201920515643.8, filed with the State Intellectual Property Office of the People's Republic of China on Apr. 16, 2019, entitled "END PLATE FOR BATTERY MODULE, AND BATTERY MODULE", all of which are incorporated herein by reference in their entirety.

TECHNICAL FIELD

This application relates to the technical field of an energy storage device, and in particular, to an end plate of a battery module as well as a battery module.

BACKGROUND

A casing of a battery module is one of core parts of the battery module. A space for accommodating a battery is formed inside the casing. A casing of a conventional battery module is formed by welding extruded aluminum end plates and sheet-metal aluminum side plates. Generally, a gap exists between an end plate and a side plate. During the welding, a laser beam passes through the gap between the end plate and the side plate and irradiates batteries inside the casing. After being irradiated by the laser, the batteries are prone to explode under a high temperature, and incur safety hazards.

SUMMARY

This application provides an end plate of a battery module as well as a battery module to enhance structural reliability of the battery module.

A first aspect of this application provides an end plate of a battery module, including a body and a connector connected to the body.

The body is fixedly connected to a side plate of the battery module through the connector;

The connector is provided with a light shielding part, and the light shielding part is located on a side of the connector that faces the side plate, and located between the connector and the side plate.

Exemplarily, the body is provided with a mounting slot, and the mounting slot is through-aligned along a height direction of the battery module.

The connector is plugged in the mounting slot.

Exemplarily, the connector includes a plugging part and a connecting part. The plugging part extends along the height direction of the battery module and fits with the mounting slot snugly. The connecting part is fixedly connected to the side plate of the battery module. The light shielding part is located between the connecting part and the side plate.

Exemplarily, the plugging part is a bar shape.

Exemplarily, projections of both the mounting slot and the plugging part in the height direction of the battery module are trapezoidal.

Exemplarily, the mounting slot opens narrower at a position near the side plate than at a position away from the side plate.

An outer contour of the plugging part is configured to match an inner contour of the mounting slot.

Exemplarily, projections of both the mounting slot and the plugging part in the height direction of the battery module are arc-shaped.

Exemplarily, a central angle of the mounting slot is greater than 180 degrees.

An outer contour of the plugging part is configured to match an inner contour of the mounting slot.

Exemplarily, the connecting part includes a first sheet and a second sheet, and the light shielding part includes a terraced part located between the first sheet and the second sheet.

Exemplarily, the light shielding part further includes an elastomer, and the elastomer is elastically supported between the connecting part and the side plate.

A second aspect of this application provides a battery module, including a side plate and any of the end plates for a battery module described above. A connector of the end plate of a battery module is fixedly connected to the side plate.

The technical solutions disclosed in this application achieve the following beneficial effects:

In the end plate of a battery module as well as the battery module according to this application, the end plate of a battery module includes the body and the connector, and weldability between the body and the side plate is improved by the connector. The connector includes a light shielding part. The light shielding part avoids the problem of battery explosion caused by a laser beam radiated to a battery inside the battery module, and improves safety performance of the battery.

Understandably, the above general description and the following detailed description are only exemplary without limiting this application.

REFERENCE NUMERALS

100: End plate for a battery module;
10: Body;
11: First side face;
12: Mounting slot;
20: Connector;
21: Plugging part;
22: Connecting part;
221: First sheet;
222: Second sheet;
23: Light shielding part;
231: Terraced part;
232: Elastomer; and
200: Side plate.

DESCRIPTION OF EMBODIMENTS

The following explicitly and fully describes the technical solutions of this application with reference to accompanying drawings. Apparently, the described embodiments are a part rather than all of the embodiments of this application. All other embodiments derived by a person of ordinary skill in the art based on the embodiments of this application without making any creative efforts shall fall within the protection scope of this application.

Figure 1:
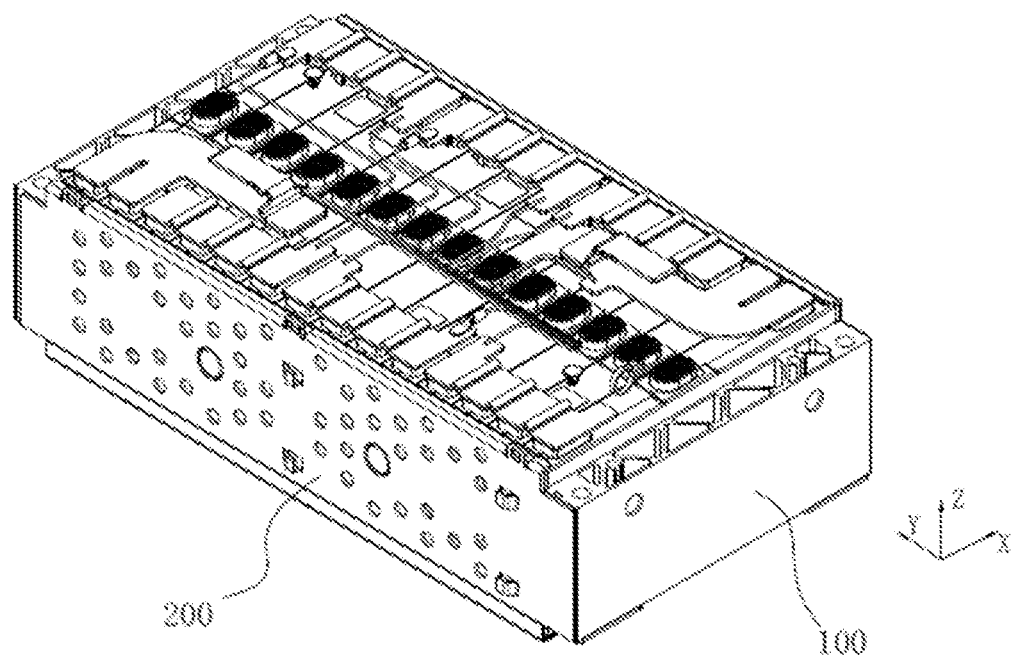
FIG. 1 is a schematic structural diagram of a battery module according to a first embodiment of this application.
Figure 2:
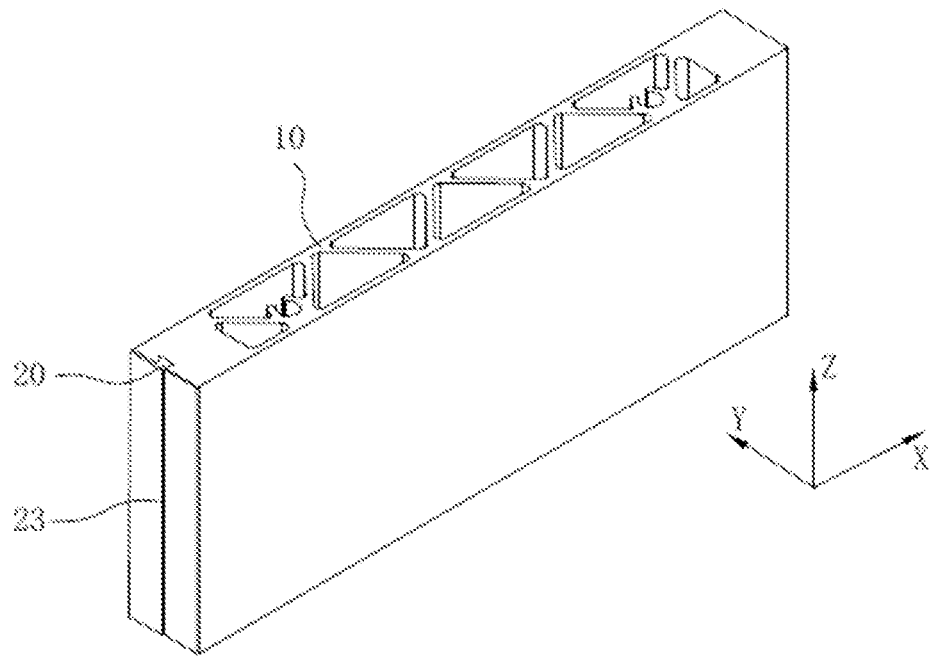
FIG. 2 is a schematic structural diagram of an end plate of a battery module according to a first embodiment of this application.

FIG. 1 is a schematic structural diagram of a battery module according to a first embodiment of this application. As shown in FIG. 1, an embodiment of this application provides a battery module, including a plurality of battery cells, a side plate 200 connected to the battery cells and an end plate 100 of the battery module. The end plate 100 may be fixedly connected to the side plate 200. FIG. 2 is a schematic structural diagram of an end plate of a battery module according to the first embodiment of this application. As shown in FIG. 2, the end plate 100 of the battery module may include a body 10 and a connector 20 connected to the body 10. For a single end plate 100 of the battery module, the end plate 100 of the battery module needs to be connected to two side plates 200 disposed oppositely. Therefore, two connectors 20 may be disposed, and the two connectors 20 are connected to the body 10 at a position near the side plate 200. In FIG. 2, an example is described in which only one connector 20 is disposed.

The body 10 is mainly configured to withstand a swelling force of a battery, accommodate a mounting holes, and the like. Therefore, the material of the body 10 may be die-cast aluminum. The side plate 200 may be extruded aluminum. To ensure a high weldability of the body 10 of the end plate 100 of the battery module and the side plate 200, a connector 20 is disposed according to an embodiment of this application. The connector 20 may adopt a sheet metal aluminum.

Figure 3:
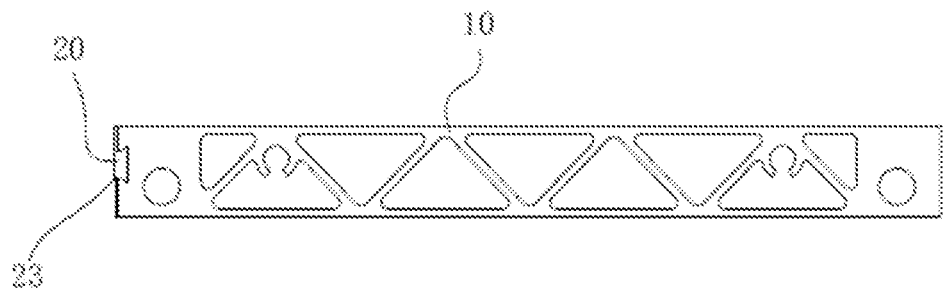
FIG. 3 is a top view of an end plate of a battery module according to a first embodiment of this application.

In laser welding between the connector 20 and the side plate 200, a laser beam may be emitted into the end plate 100 of the battery module from a connection gap between the connector and the side plate. The battery in the battery module is prone to explosion under a high temperature after being irradiated by the laser beam. Therefore, the connector 20 is provided with a light shielding part 23. FIG. 3 is a top view of an end plate of a battery module according to a first embodiment of this application. As shown in FIG. 3, the light shielding part 23 is located on a side of the connector 20 toward the side plate 200, and located between the connector 20 and the side plate 200. The light shielding part 23 avoids battery safety problems caused by radiation of the laser beam to the battery.

Figure 4:
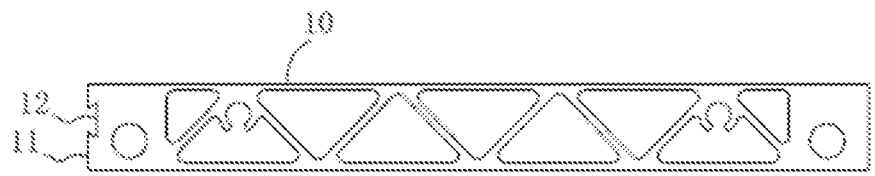
FIG. 4 is a top view of a body in an end plate of a battery module according to a first embodiment of this application.

FIG. 4 is a top view of a body in an end plate of a battery module according to a first embodiment of this application. Referring to FIG. 2 to FIG. 4, the body 10 may be provided with a mounting slot 12. The mounting slot 12 is through-aligned along a height direction (a Z direction in FIG. 1 and FIG. 2) of the battery module. The connector 20 is plugged in the mounting slot 12. In this way, the body 10 is disposed independently of the connector 20, both being able to be assembled together after being processed separately. This structure makes the processing thereof more flexible, and improves strength of connection between the body and the connector more effectively.

Figure 5:
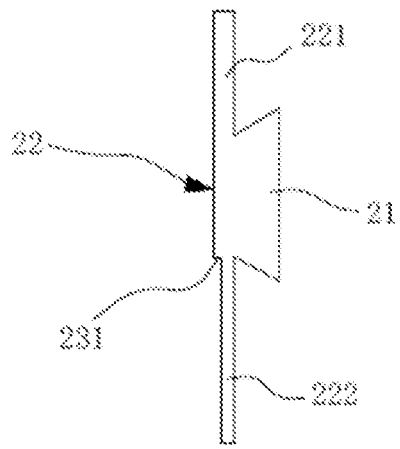
FIG. 5 is a top view of a connector in an end plate of a battery module according to a first embodiment of this application.

FIG. 5 is a top view of a connector in an end plate of a battery module according to a first embodiment of this application. Exemplarily, the connector 20 includes a plugging part 21 and a connecting part 22. The plugging part 21 extends along the height direction (the Z direction in FIG. 1 and FIG. 2) of the battery module and fits with the mounting slot 12 snugly. The connecting part 22 is fixedly connected to the side plate 200 for the battery module. The light shielding part 23 is located between the connecting part 22 and the side plate 200.

The body 10 may be provided with only one mounting slot 12. The connector 20 includes a plugging part 21, and the strength of the snug fit of the plugging part 21 with the mounting slot 12 is sufficient. Exemplarily, the plugging part is bar shape. If the plugging part is a sheet-like or plate-like structure for fitting with the mounting slot 12, the plugging strength is insufficient, and generally two or more mounting slots 12 are needed to ensure reliable connection. Therefore, the end plate 100 of the battery module provided in this embodiment of this application ensures reliability of the connection between the body 10 and the connector 20 by virtue of the bar-shaped plugging part 21 located on the connector 20. The connector 20 further includes a connecting part 22. The connecting part 22 implements a fixed connection between the body 10 and the side plate 200.

As shown in FIG. 2 to FIG. 5, in an exemplary implementation, projections of both the mounting slot 12 and the plugging part 21 in the height direction of the battery module are trapezoidal. Such a structure is suitable to a circumstance in which it is not convenient to open the mounting slot 12 at an edge position of the body 10. The mounting slot 12 may be opened on a first side face 11 of the body 10. The specific position of the mounting slot 12 on the first side face 11 is not limited. The mounting slot may be located in the middle of the first side face 11, or close to the edge of the first side face 11, or at a position that is appropriately adjusted according to the size of the side plate 200.

Exemplarily, the mounting slot 12 opens narrower at a position near the side plate 200 than at a position away from the side plate 200. An outer contour of the plugging part 21 is configured to match an inner contour of the mounting slot 12. Such a structure with a narrow opening and a wide inner cavity prevents the plugging part 21 from falling out of the mounting slot 12 and improves reliability of the connection between the connector 20 and the body 10.

Figure 6:
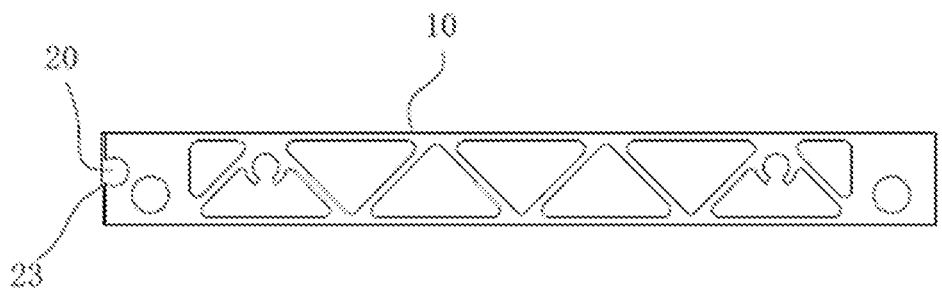
FIG. 6 is a top view of an end plate of a battery module according to a second embodiment of this application.
Figure 7:
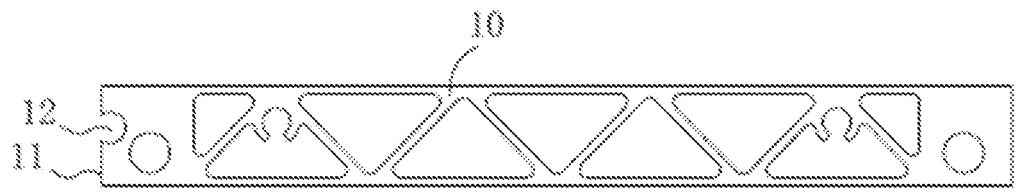
FIG. 7 is a top view of a body in an end plate of a battery module according to a second embodiment of this application.
Figure 8:
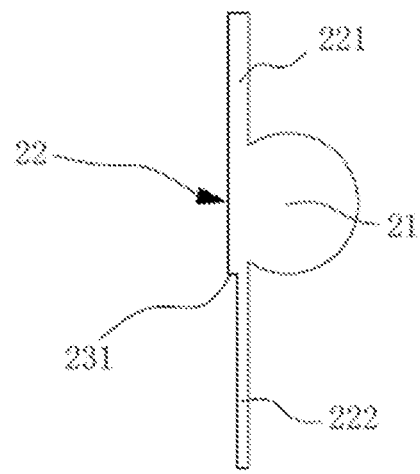
FIG. 8 is a top view of a connector in an end plate of a battery module according to a second embodiment of this application.

FIG. 6 is a top view of an end plate of a battery module according to a second embodiment of this application; FIG. 7 is a top view of a body in an end plate of a battery module according to the second embodiment of this application; and FIG. 8 is a top view of a connector in an end plate of a battery module according to the second embodiment of this application. As shown in FIG. 6 to FIG. 8, in an implementation, projections of both the mounting slot 12 and the plugging part 21 in the height direction of the battery module may be arc-shaped.

Exemplarily, a central angle of the mounting slot 12 is greater than 180 degrees, and the outer contour of the plugging part 21 is configured to match the inner contour of the mounting slot 12. Such a structure with a narrow opening and a wide inner cavity prevents the plugging part 21 from falling out of the mounting slot 12 and improves reliability of the connection between the connector 20 and the body 10.

When the mounting slot 12 is opened on the first side face 11 of the body 10, the connecting part 22 may be configured as a plate-like structure, and the connecting part 22 of the plate-like structure snugly fits, and is fixedly welded to, the side plate 200. Due to existence of the connecting part 22 of the plate-like structure and difficulty to ensure accurate flatness, a laser beam may be radiated into the end plate 100 of the battery module from a junction between the connecting part and the side plate after the connecting part 22 is welded to the side plate 200. The battery in the battery module is prone to explosion under a high temperature after being irradiated by the laser beam. Therefore, the connecting part 22 includes a first sheet 221 and a second sheet 222. A terraced part 231 exists between the first sheet 221 and the second sheet 222. The light shielding part 23 includes the terraced part 231. After the connecting part 22 snugly fits and is welded to the side plate 200, the terraced part 231 serves a function of blocking light, thereby avoiding battery safety problems caused by the radiation of the laser beam to the battery.

The terraced part 231 may be implemented by a thickness difference between the first sheet 221 and the second sheet 222, or the terraced part 231 may be implemented by staggering the first sheet 221 and the second sheet 222 that are of the same thickness.

Figure 9:
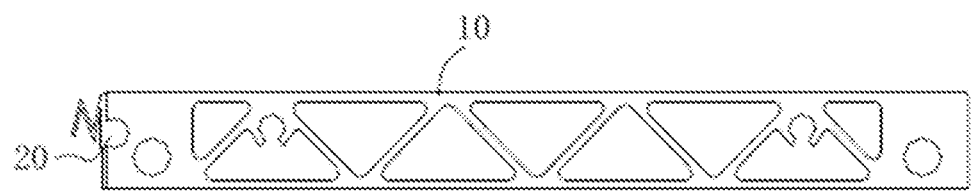
FIG. 9 is a top view of an end plate of a battery module according to a third embodiment of this application.
Figure 10:
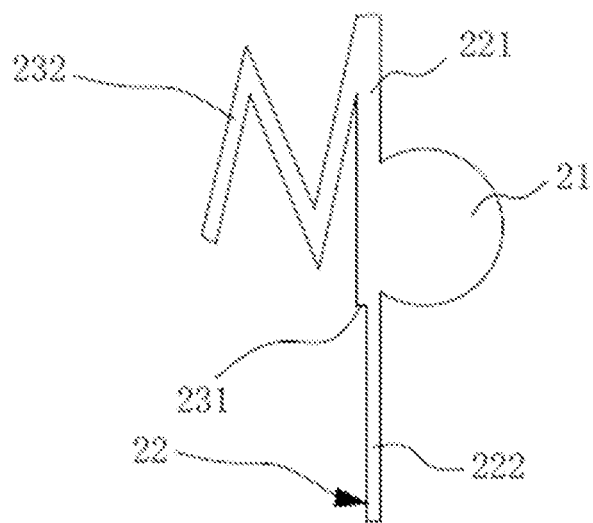
FIG. 10 is a top view of a connector in an end plate of a battery module according to a third embodiment of this application.
Figure 11:
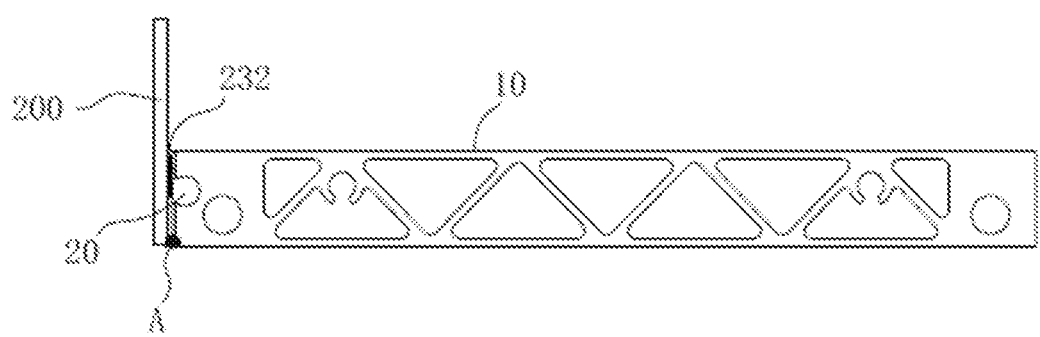
FIG. 11 is a schematic diagram of connection between an end plate of a battery module and a side plate according to a third embodiment of this application.

FIG. 9 is a top view of an end plate of a battery module according to a third embodiment of this application; FIG. 10 is a top view of a connector in an end plate of a battery module according to the third embodiment of this application; and FIG. 11 is a schematic diagram of connection between an end plate of a battery module and a side plate according to the third embodiment of this application. On the basis of the foregoing embodiment, the light shielding part 23 exemplarily further includes an elastomer 232. Referring to FIG. 9 to FIG. 11, the elastomer 232 is supported between the connecting part 22 and the side plate 200, and may be integrated with the connecting part 22. After the side plate 200 is fixedly welded to the connector 20, if a laser beam passes through a welding point A, the laser beam will be blocked by the elastomer 232, thereby avoiding battery safety problems caused by the radiation of the laser beam to the battery.

Based on the foregoing structure, an embodiment of this application further provides a battery module. The battery module includes a side plate 200 and an end plate 100 of the battery module. The side plate is fixedly connected to the end plate of a battery module. The end plate 100 of the battery module is the end plate 100 of the battery module described in any of the foregoing embodiments.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

What is claimed is:

1. An end plate of a battery module, comprising a body and a connector connected to the body, wherein
   the body is fixedly connected to a side plate of the battery module through the connector and provided with a mounting slot through-aligned along a height direction of the battery module;
   the connector is plugged in the mounting slot and provided with a light shielding part located on a side of the connector that faces the side plate;
   the connector further comprises a plugging part and a connecting part; the plugging part extends along the height direction of the battery module and fits with the mounting slot snugly; the connecting part is fixedly connected to the side plate of the battery module; and the light shielding part is located between the connecting part and the side plate;
   the connecting part further comprises a first sheet and a second sheet; and
   the light shielding part further comprises a terraced part located between the first sheet and the second sheet.

2. The end plate of a battery module according to claim 1, wherein the plugging part is a bar shape.

3. The end plate of a battery module according to claim 2, wherein projections of both the mounting slot and the plugging part in the height direction of the battery module are trapezoidal.

4. The end plate of a battery module according to claim 3, wherein the mounting slot opens narrower at a position near the side plate than at a position away from the side plate; and
   an outer contour of the plugging part is configured to match an inner contour of the mounting slot.

5. The end plate of a battery module according to claim 2, wherein projections of both the mounting slot and the plugging part in the height direction of the battery module are arc-shaped.

6. The end plate of a battery module according to claim 5, wherein a central angle of the mounting slot is greater than 180 degrees; and
   an outer contour of the plugging part is configured to match an inner contour of the mounting slot.

7. The end plate of a battery module according to claim 1, wherein the light shielding part further comprises an elastomer, and the elastomer is elastically supported between the connecting part and the side plate.

8. A battery module, comprising a plurality of battery cells, a side plate connected to the plurality of battery cells and an end plate, the end plate comprising a body and a connector connected to the body, wherein:
   the body is fixedly connected to the side plate through the connector and provided with a mounting slot, and the mounting slot is through-aligned along a height direction of the battery module;
   the connector is plugged in the mounting slot and provided with a light shielding part located on a side of the connector that faces the side plate;
   the connector further comprises a plugging part and a connecting part; the plugging part extends along the height direction of the battery module and fits with the mounting slot snugly; the connecting part is fixedly connected to the side plate of the battery module; and the light shielding part is located between the connecting part and the side plate;
   the connecting part further comprises a first sheet and a second sheet; and
   the light shielding part further comprises a terraced part located between the first sheet and the second sheet.

9. The battery module according to claim 8, wherein the plugging part is a bar shape.

10. The battery module according to claim 9, wherein projections of both the mounting slot and the plugging part in the height direction of the battery module are trapezoidal.

11. The battery module according to claim 10, wherein the mounting slot opens narrower at a position near the side plate than at a position away from the side plate; and an outer contour of the plugging part is configured to match an inner contour of the mounting slot.

12. The battery module according to claim 9, wherein projections of both the mounting slot and the plugging part in the height direction of the battery module are arc-shaped.

13. The battery module according to claim 12, wherein a central angle of the mounting slot is greater than 180 degrees; and an outer contour of the plugging part is configured to match an inner contour of the mounting slot.

14. The battery module according to claim 8, wherein the light shielding part further comprises an elastomer, and the elastomer is elastically supported between the connecting part and the side plate.

\* \* \* \* \*